3,314,799
TASTE IMPROVEMENT IN MARGARINE
Anne Josephine Neilson, Cambridge, and Richard Lawrence Hughes, West Roxbury, Mass., assignors, by mesne assignments, to Abbott Laboratories, Chicago, Ill., a corporation of Illinois
No Drawing. Filed Dec. 16, 1964, Ser. No. 418,888
2 Claims. (Cl. 99—123)

The present invention relates to a method of improving and enhancing the taste of margarine.

Margarine has become a well-accepted substitute for butter as a bread spread and for cooking. However, its acceptance as a butter substitute is primarily based on its economics, since taste and flavor of margarine in most instances is far inferior to that of butter. Particularly, the cheaper brands of margarine have an oxidized, oily (waxy) flavor characteristic with sourness, saltiness or hydrogenated vegetable oil notes not being well blended. They are thus primarily used for cooking and have not found universal acceptance as a spread for bread or rolls because of their lack of flavor qualities.

It is thus the main object of the present invention to improve and enhance flavor and taste of margarine. Other objects will be apparent from the following disclosure and example.

The object of this invention is accomplished by the process of adding to a margarine between 0.01% and 0.02% by weight of cyclohexylsulfamic acid (hereinafter referred to as cyclamic acid), and uniformly distributing cyclamic acid in said margarine. Cyclamic acid is the anion of sodium and calcium cyclamates which have found widespread acceptance as artificial sweeteners. Cyclamic acid itself has a sour-sweet taste but in the amounts specified above, neither the sourness nor the sweetness thereof can be detected, since these amounts are below the threshold level of cyclamic acid in an oil product. It is thus surprising to find that by adding such very small amounts of cyclamic acid to margarine, flavor, taste, and character of said product is greatly improved. In addition to enchancing the natural flavor of margarine, the present process also substantially decreases the undesirable character note produced by the hydrogenated vegetable oils present in margarine. These hydrogenated vegetable oils make up a significant portion of the total weight in margarine; they are used in combination with regular vegetable oils, animal oils, animal fats, and the like, to make up 80% by weight of the margarine on the grocery shelf, the remaining weight being made up by salt, water, emulsifiers, and other additives used in smaller quantities.

The effects of the method of the present invention are better described in view of the following example, which is an illustration only. The flavor description is based on the findings of a highly-specialized flavor panel using the "Flavor Profile Analysis" method established by Arthur D. Little, Inc., and published in "Flavor Research and Food Acceptance" (Reinhold Publishing Corp., New York, 1958; pages 65 ff.).

Example

A nationally-known brand of margarine was divided into two portions, each portion being placed in a food blender. To one portion, 0.01% by weight of cyclamic acid based on the margarine present was added, and both samples were blended for the same time period to eliminate any difference in appearance and texture which might influence the flavor perception. Both samples were tasted in their blended form alone and also as spreads on white and rye bread and on freshly-baked rolls. In all instances, the control sample could easily be detected by its saltiness, its lack of flavor character, and the side taste of hydrogenated vegetable oils. In all the test samples, on the other hand, the side taste of hydrogenated vegetable oils was significantly reduced, the salty character was decreased, and a much more pleasant dairy-type character note prevailed. The test samples also appeared to have a better blended flavor.

When the amount of cyclamic acid used above was increased to 0.02%, essentially the same findings were made except that the side taste of hydrogenated vegetable oils was completely absent and the saltiness was found reduced.

As demonstrated above, significant flavor improvements can be obtained in margarine by adding thereto 0.01% to 0.02% by weight of cyclamic acid. When the cyclamic acid addition is below the above range, an improvement is only detectable by the most sensitive consumer, while when the amount of cyclamic acid is above 0.02%, the sensitive consumer will detect the sweet-sour note characteristic to higher concentrations of cyclamic acid which is not desirable in a butter substitute product such as margarine.

The process of the present invention provides a simple means of improving the quality of margarines. In fact, the flavor panel determined in one of the studies that an inexpensive margarine using low-grade vegetable oils as main components show a flavor improvement to such a degree that the final product resembles closely the taste of the most expensive margarines which are based on the more refined, high-cost, and high-quality vegetable oil products. The new method therefore is of significant economic importance.

Others may practice the invention in any of the numerous ways which will be suggested to one skilled in the art by the present disclosure. All such practice of the invention is considered a part hereof provided it falls within the scope of the appended claims.

We claim:
1. The process of adding cyclamic acid to margarine and blending the mixture uniformly, said cyclamic acid being added in an amount between 0.01% and 0.02% by weight of said margarine.
2. A margarine containing between 0.01% and 0.02% by weight of cyclamic acid, said cyclamic acid being uniformly distributed in said margarine.

No references cited.

A. LOUIS MONACELL, *Primary Examiner.*

H. H. KLARE, *Assistant Examiner.*